(12) United States Patent
Ishikawa (10) Patent No.: US 8,086,403 B2
(45) Date of Patent: Dec. 27, 2011

(54) ROUTE SEARCH METHOD, ROUTE GUIDANCE SYSTEM, NAVIGATION SYSTEM, AND STATISTICAL PROCESSING SERVER

(75) Inventor: Hiroki Ishikawa, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 779 days.

(21) Appl. No.: 11/707,071

(22) Filed: Feb. 16, 2007

(65) Prior Publication Data

US 2007/0198179 A1 Aug. 23, 2007

(30) Foreign Application Priority Data

Feb. 17, 2006 (JP) .................................. 2006-040753

(51) Int. Cl.
*G08G 1/123* (2006.01)
(52) U.S. Cl. .................... 701/209; 340/988; 340/995.13
(58) Field of Classification Search .................. 701/209; 340/988, 995.13; *G08G 1/123*
See application file for complete search history.

(56) References Cited

U.S. PATENT DOCUMENTS

| | | | |
|---|---|---|---|
| 6,199,014 B1 * | 3/2001 | Walker et al. ................. | 701/211 |
| 6,317,686 B1 | 11/2001 | Ran | |
| 6,532,475 B1 * | 3/2003 | Nakano et al. ................ | 709/219 |
| 6,922,629 B2 | 7/2005 | Yoshikawa et al. | |
| 7,342,516 B2 * | 3/2008 | Kato et al. ............... | 340/995.19 |
| 7,355,528 B2 * | 4/2008 | Yamane et al. .......... | 340/995.13 |
| 2004/0160466 A1 * | 8/2004 | Annacone .......................... | 347/2 |
| 2004/0181337 A1 * | 9/2004 | Kawasaki et al. ............. | 701/209 |
| 2004/0260465 A1 * | 12/2004 | Tu ................................ | 701/209 |
| 2005/0234639 A1 * | 10/2005 | Endo et al. .................... | 701/209 |
| 2007/0106466 A1 * | 5/2007 | Noguchi ........................ | 701/209 |
| 2008/0201066 A1 * | 8/2008 | Kanazawa .................... | 701/118 |

FOREIGN PATENT DOCUMENTS

| | | |
|---|---|---|
| EP | 1 580 531 A2 | 9/2005 |
| JP | A-2000-258174 | 9/2000 |
| JP | A-2002-062154 | 2/2002 |
| JP | A 2004-301667 | 10/2004 |
| JP | A-2004-301677 | 10/2004 |
| JP | A-2004-347448 | 12/2004 |
| JP | A-2005-030873 | 2/2005 |
| JP | A-2005-122461 | 5/2005 |
| JP | A-2006-162323 | 6/2006 |

OTHER PUBLICATIONS

Japanese Patent Office, Notification of Reason(s) for Refusal mailed Jul. 6, 2010 in Japanese Patent Application No. 2006-040753 w/Partial English-language Translation.

* cited by examiner

*Primary Examiner* — Tuan C To
(74) *Attorney, Agent, or Firm* — Oliff & Berridge, PLC

(57) ABSTRACT

Systems, methods, and programs store predicted distance range data, in which distance ranges where a vehicle will be within a specified time are predicted for individual zones and individual time periods, and store traffic data that is created based on traffic circumstances in individual links and individual time periods. The systems, methods, and programs define, based on the predicted distance range data and using the current time as a reference, a temporal sequence of predicted distance ranges centered at the current host vehicle position. The systems, methods, and programs search for a recommended route from the current host vehicle position to the destination among links within each of the defined predicted distance ranges, the recommended route determined by using the traffic data for the time periods that correspond to the predicted distance ranges.

21 Claims, 11 Drawing Sheets

| MESH ID | SEASON | DAY | TIME | | | | | | | | |
|---|---|---|---|---|---|---|---|---|---|---|---|
| | | | SLICE WIDTH FROM 0:00 | SLICE WIDTH FROM 0:15 | ... | SLICE WIDTH FROM 10:15 | SLICE WIDTH FROM 10:30 | ... | SLICE WIDTH FROM 23:30 | SLICE WIDTH FROM 23:45 | |
| 1 | SPRING | MONDAY | SLICE WIDTH FROM 0:00 | SLICE WIDTH FROM 0:15 | ... | SLICE WIDTH FROM 10:15 | SLICE WIDTH FROM 10:30 | ... | SLICE WIDTH FROM 23:30 | SLICE WIDTH FROM 23:45 | |
| | | TUESDAY | SLICE WIDTH FROM 0:00 | SLICE WIDTH FROM 0:15 | ... | SLICE WIDTH FROM 10:15 | SLICE WIDTH FROM 10:30 | ... | SLICE WIDTH FROM 23:30 | SLICE WIDTH FROM 23:45 | |
| | | ⋮ | ⋮ | ⋮ | ⋮ | ⋮ | ⋮ | ⋮ | ⋮ | ⋮ | |
| | | SUNDAY | SLICE WIDTH FROM 0:00 | SLICE WIDTH FROM 0:15 | ... | SLICE WIDTH FROM 10:15 | SLICE WIDTH FROM 10:30 | ... | SLICE WIDTH FROM 23:30 | SLICE WIDTH FROM 23:45 | |
| | | HOLIDAY | SLICE WIDTH FROM 0:00 | SLICE WIDTH FROM 0:15 | ... | SLICE WIDTH FROM 10:15 | SLICE WIDTH FROM 10:30 | ... | SLICE WIDTH FROM 23:30 | SLICE WIDTH FROM 23:45 | |
| | SUMMER | | ... | | | | | | | | |
| | AUTUMN | | ... | | | | | | | | |
| | WINTER | | ... | | | | | | | | |
| | CONSECUTIVE HOLIDAYS | | ... | | | | | | | | |
| 2 | | | ... | | | | | | | | |
| 3 | | | ... | | | | | | | | |
| ⋮ | | | ⋮ | | | | | | | | |
| 4500 | | | ... | | | | | | | | |

| MESH ID | SEASON | DAY | TIME | | | | | | |
|---|---|---|---|---|---|---|---|---|---|
| 31a | 31b | 31c | 31d | | | | | | |
| | | | SLICE WIDTH FROM 0:00 | SLICE WIDTH FROM 0:15 | ... | SLICE WIDTH FROM 10:15 | SLICE WIDTH FROM 10:30 | ... | SLICE WIDTH FROM 23:30 | SLICE WIDTH FROM 23:45 |
| 1 | SPRING | MONDAY | SLICE WIDTH FROM 0:00 | SLICE WIDTH FROM 0:15 | ... | SLICE WIDTH FROM 10:15 | SLICE WIDTH FROM 10:30 | ... | SLICE WIDTH FROM 23:30 | SLICE WIDTH FROM 23:45 |
| | | TUESDAY | SLICE WIDTH FROM 0:00 | SLICE WIDTH FROM 0:15 | ... | SLICE WIDTH FROM 10:15 | SLICE WIDTH FROM 10:30 | ... | SLICE WIDTH FROM 23:30 | SLICE WIDTH FROM 23:45 |
| | | ... | ... | ... | | ... | ... | | ... | ... |
| | | SUNDAY | SLICE WIDTH FROM 0:00 | SLICE WIDTH FROM 0:15 | ... | SLICE WIDTH FROM 10:15 | SLICE WIDTH FROM 10:30 | ... | SLICE WIDTH FROM 23:30 | SLICE WIDTH FROM 23:45 |
| | | HOLIDAY | SLICE WIDTH FROM 0:00 | SLICE WIDTH FROM 0:15 | ... | SLICE WIDTH FROM 10:15 | SLICE WIDTH FROM 10:30 | ... | SLICE WIDTH FROM 23:30 | SLICE WIDTH FROM 23:45 |
| | SUMMER | | | | | | | | | |
| | AUTUMN | | | | | | | | | |
| | WINTER | | | | | | | | | |
| | CONSECUTIVE HOLIDAYS | | | | | | | | | |
| 2 | | | | | | | | | | |
| 3 | | | | | | | | | | |
| ... | | | | | | | | | | |
| 4500 | | | | | | | | | | |

|  | LINK N | LINK N+1 | LINK N+2 | LINK N+3 |
|---|---|---|---|---|
| 0:00~ | 3 | 14 | 10 | 6 |
| ⋮ | ⋮ | ⋮ | ⋮ | ⋮ |
| 10:15~ | 2 | 13 | 14 | 5 |
| 10:30~ | 2 | 12 | 15 | 6 |
| ⋮ | ⋮ | ⋮ | ⋮ | ⋮ |
| 23:45~ | 2 | 2 | 2 | 2 |

ROUTE SEARCH METHOD, ROUTE GUIDANCE SYSTEM, NAVIGATION SYSTEM, AND STATISTICAL PROCESSING SERVER

INCORPORATION BY REFERENCE

The disclosure of Japanese Patent Application No. 2006-040753, filed on Feb. 17, 2006, including the specification, drawings and abstract is incorporated herein by reference in its entirety.

BACKGROUND

1. Related Technical Fields

Related technical fields include route search methods, route guidance systems, navigation systems, and statistical processing servers.

2. Description of the Related Art

In recent years, the development of Intelligent Transportation Systems has been promoted in an attempt to achieve smoother automobile driving. One field in which development has been promoted is advanced navigation systems. An example is a navigation system equipped with Vehicle Information and Communication System (VICS®) functions. Such navigation systems receive information from beacons and FM multiplex broadcasts about current traffic congestion conditions and execute route guidance to avoid congested locations.

Also, in Japanese Patent Application Publication No. JP-A-2004-301677, a navigation system is described in which a map of the entire country is divided into and stored in grid or "mesh" regions, statistical information is stored for each mesh region, and the statistical information is used in searching for a recommended route. The statistical information is statistically processed traffic information on individual factors such as time periods, weekdays, holidays, and the like for each mesh region and is made up of travel times, travel speeds, and the like for individual links. The navigation system also predicts a standard arrival time in each mesh region based on a departure point. The navigation system then selects from among statistical information that was stored in advance the statistical information for the time period in which the arrival time falls and uses that statistical information to search for a route that will shorten the travel time.

SUMMARY

However, the navigation system described above predicts the arrival time in a given mesh region by determining representative coordinates for a rectangular mesh region, then dividing the straight-line distance from the current position to the representative coordinates by a predetermined speed. Because the arrival times for a plurality of mesh regions are calculated in this manner, the volume of processing can become excessive and that the accuracy of the predicted arrival timers may drop, particularly in corner portions and edge portions of the mesh regions. This in turn raises the possibility that the recommended route will be determined using statistical information for a time period much different from the actual arrival time.

Also, the navigation system described above predicts the arrival time by dividing the straight-line distance to the representative coordinates by a predetermined speed. Thus the process for predicting the arrival time does not consider such factors as the region, the time period, whether it is a weekday or a holiday, and the like. Therefore the accuracy of the predicted arrival time may be diminished.

Various exemplary implementations of the broad principles described herein provide a route search method that can accurately search for a recommended route, as well as a route guidance system, a navigation system, and a statistical processing server.

Various exemplary implementations provide systems, methods, and programs that may store predicted distance range data, in which distance ranges where a vehicle will be within a specified time are predicted for individual zones and individual time periods, and may store traffic data that is created based on traffic circumstances in individual links and individual time periods. The systems, methods, and programs may define, based on the predicted distance range data and using the current time as a reference, a temporal sequence of predicted distance ranges centered at the current host vehicle position. The systems, methods, and programs may search for a recommended route from the current host vehicle position to the destination among links within each of the defined predicted distance ranges, the recommended route determined by using the traffic data for the time periods that correspond to the predicted distance ranges.

Various exemplary implementations provide systems, methods, and programs that may statistically process road traffic information or probe information that is collected from individual vehicles and may create predicted distance range data in which distance ranges where a vehicle will be within specified times are predicted for individual zones and individual time periods. The systems, methods, and programs may create, based on the road traffic information or the probe information, traffic data based on traffic circumstances in individual links and individual time periods.

DETAILED DESCRIPTION OF EXEMPLARY IMPLEMENTATIONS

Figure 1:
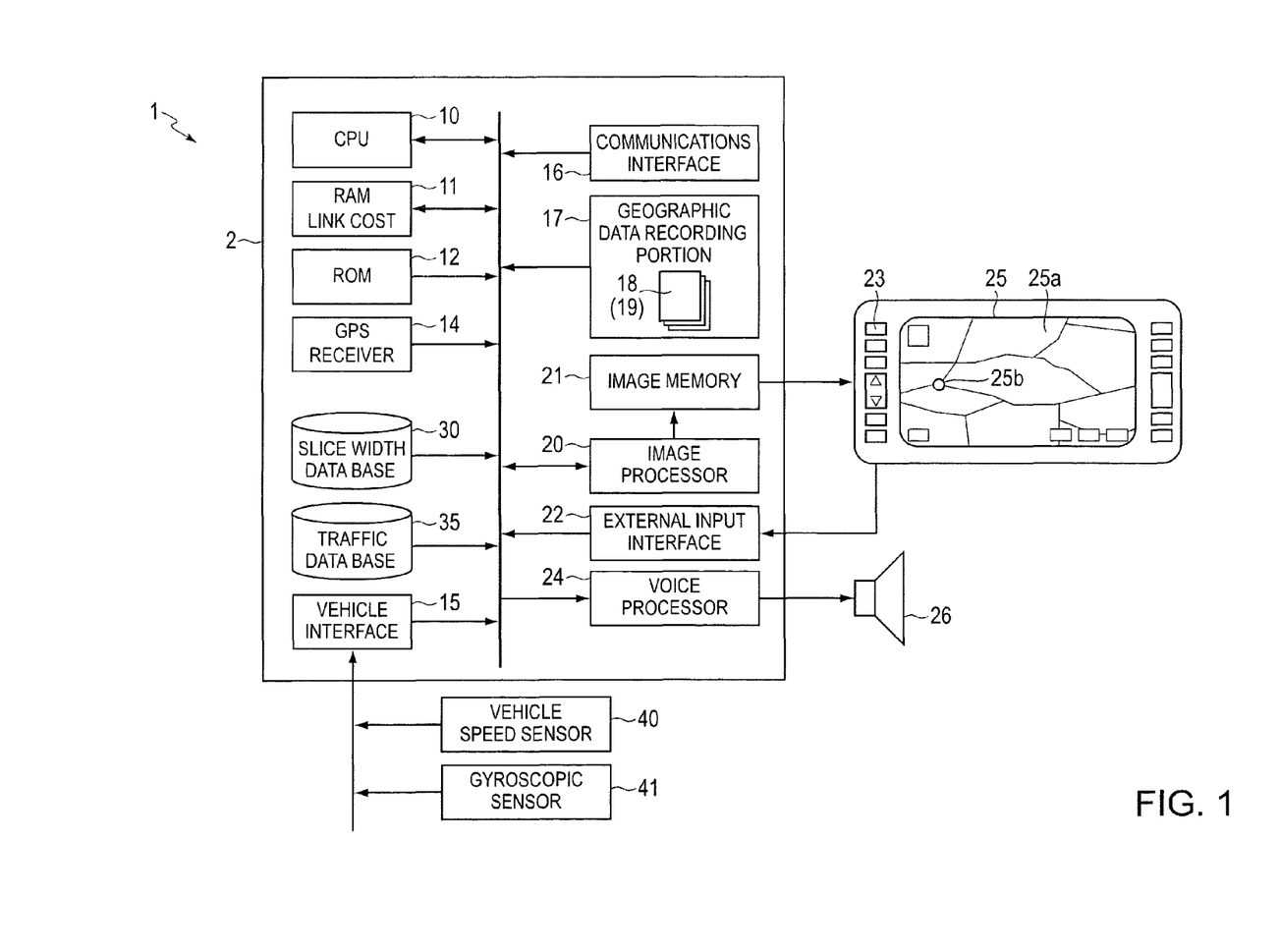
FIG. 1 is a block diagram of an exemplary navigation system.

FIG. 1 shows an explanatory navigation system 1 that may be installed in a vehicle.

As shown in FIG. 1, a navigation unit 2 of the navigation system 1 may include a controller (e.g., CPU 10) and a RAM 11. The navigation system 1 may include a ROM 12, in which a route guidance program may stored, and a GPS receiver 14. A position detection signal that indicates coordinates such as latitude, longitude, and the like and received by the GPS receiver 14 from a Global Positioning System (GPS) satellite, may be input to the CPU 10, which may use radio navigation to compute an absolute position for a host vehicle. Through a vehicle interface 15 included in the navigation unit 2, a vehicle speed pulse and an angular velocity may be input to the CPU 10 from a vehicle speed sensor 40 and a gyroscopic sensor 41, respectively. The CPU 10 may use the vehicle speed pulse and the angular velocity to compute a relative position in relation to a reference position. The CPU 10 may then specify the host vehicle position by combining the relative position with the absolute position that was computed by radio navigation.

A communications interface 16 of the navigation unit 2 may receive VICS® signals (or other similar signals) from radio beacons or optical beacons installed alongside the road or the like, or from FM multiplex broadcasting base stations. The VICS® signals may contain road traffic information by city or prefecture, as well as road traffic information that indicates the traffic circumstances within a range of several tens of kilometers to several hundred kilometers in the direction of travel from the current position.

The navigation unit 2 may also include a geographic data recording portion 17. The geographic data recording portion 17 may be a built-in hard disk or an external recording medium such as an optical disk or the like. Network data for each route (hereinafter called route data 18), to be used in searching for a route to a destination, and map drawing data 19 for each map that is output to a map screen 25a of a display 25 may be stored in the geographic data recording portion 17.

Figure 2A:
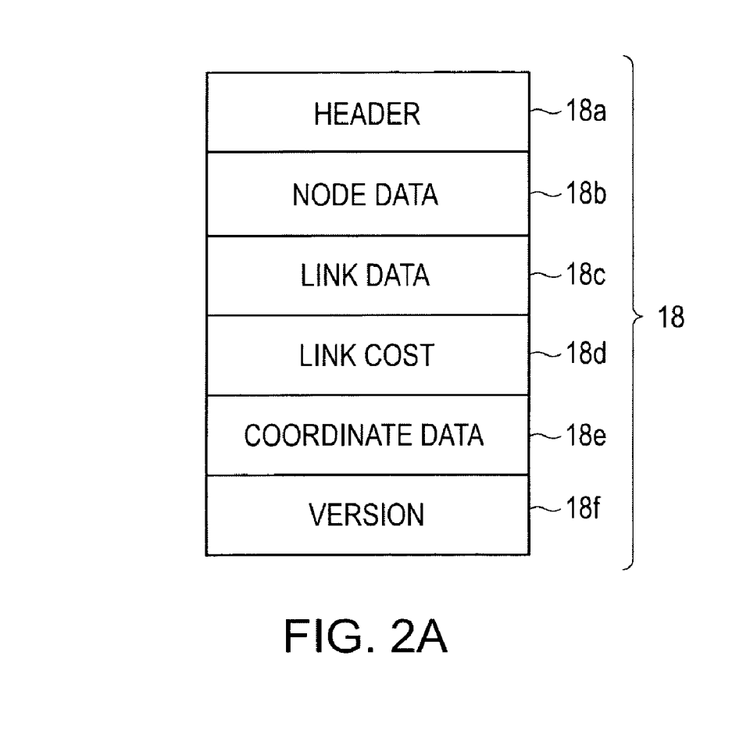
FIG. 2A is a diagram of an exemplary data structure for route data.

As shown in FIG. 2A, the route data 18 may include a header 18a, which may be data for each region into which the entire country is partitioned, node data 18b, which contains node numbers and the like indicating intersections and end points of roads. The route data 18 may include link data 18c, which contains identifiers and the like for links between the nodes, a link cost 18d, coordinate data 18e, which indicates the coordinates of nodes and links, a version 18f, and the like. The header 18a may contain a mesh number or the like to identify each region into which the entire country is partitioned. The link data 18c may include data on link identifiers, connecting nodes, through-travel restrictions, and the like. The link cost 18d may be a fixed value and may include data based on the link length and road width for each link.

As used herein, the term "link" refers to, for example, a road or portion of a road. For example, according to one type of road data, each road may consist of a plurality of componential units called links. Each link may be separated and defined by, for example, an intersection, an intersection having more than three roads, a curve, and/or a point at which the road type changes. As used herein the term "node" refers to a point connecting two links. A node may be, for example, an intersection, an intersection having more than three roads, a curve, and/or a point at which the road type changes.

Employing publicly known methods such as a Dykstra method and the like, the CPU 10 may use the route data 18 to search for a recommended route from the current host vehicle position to the destination, such as a route that will shorten the travel time, an easy-to-drive route, or the like.

Figure 2B:
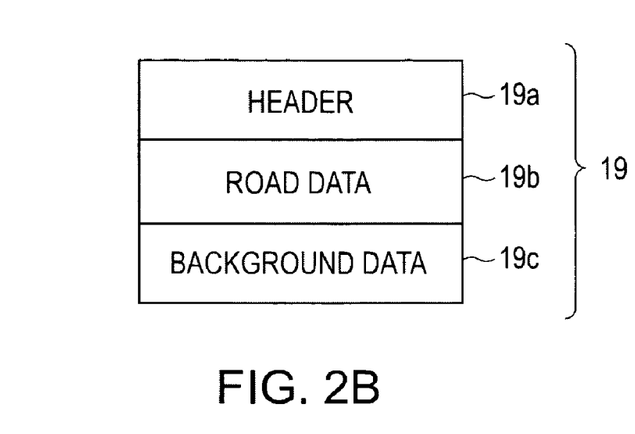
FIG. 2B is a diagram of an exemplary data structure for map drawing data.

The map drawing data 19 may be stored for each mesh (parcel) into which a map of the entire country is divided and are divided into different levels, from wide-area maps to local-area maps. As shown in FIG. 2B, the map drawing data 19 may include a header 19a, road data 19b, background data 19c, and the like. The header 19a may include the mesh number, the level of the data, and the like. The road data 19b may be data that are displayed on the map and include data that indicates the shape of the road, such as shape compensation data, road width data, and the like. The background data 19c may be drawing data that depict roads, urban areas, rivers, and the like.

The navigation unit 2 may include an image processor 20 (refer to FIG. 1), which, based on instructions from the CPU 10, may read the map drawing data 19 from the geographic data recording portion 17 in order to draw a map of the area surrounding the host vehicle position. The image processor 20 may create output data and may store it temporarily in an image memory 21. Based on the output data, the image processor 20 may output an image signal to the display 25, thereby displaying an image on the map display screen 25a. The image processor 20 may superimposes a marker 25b on the map display screen 25a to indicate the host vehicle position.

Also, an operation switch 23 may be installed adjacent to the display 25. When the operation switch 23 is operated, an external input interface 22 that may be provided in the navigation unit 2 may output a signal to the CPU 10 according to an input operation of the operation switch 23.

A voice processor 24 of the navigation unit 2, under the control of the CPU10, may reads a voice file from a voice file database (not shown). The voice processor 24 may also output voice signals and the like to a speaker 26 to provide route guidance.

The navigation unit 2 may includes a slice width database 30 and a traffic database 35. The slice width database 30 may serve as a predicted distance range data storage portion in which slice width data 31 may be stored as predicted distance range data. The traffic database 35 may serve as a traffic data storage portion in which traffic data 36 are stored.

Figure 3:
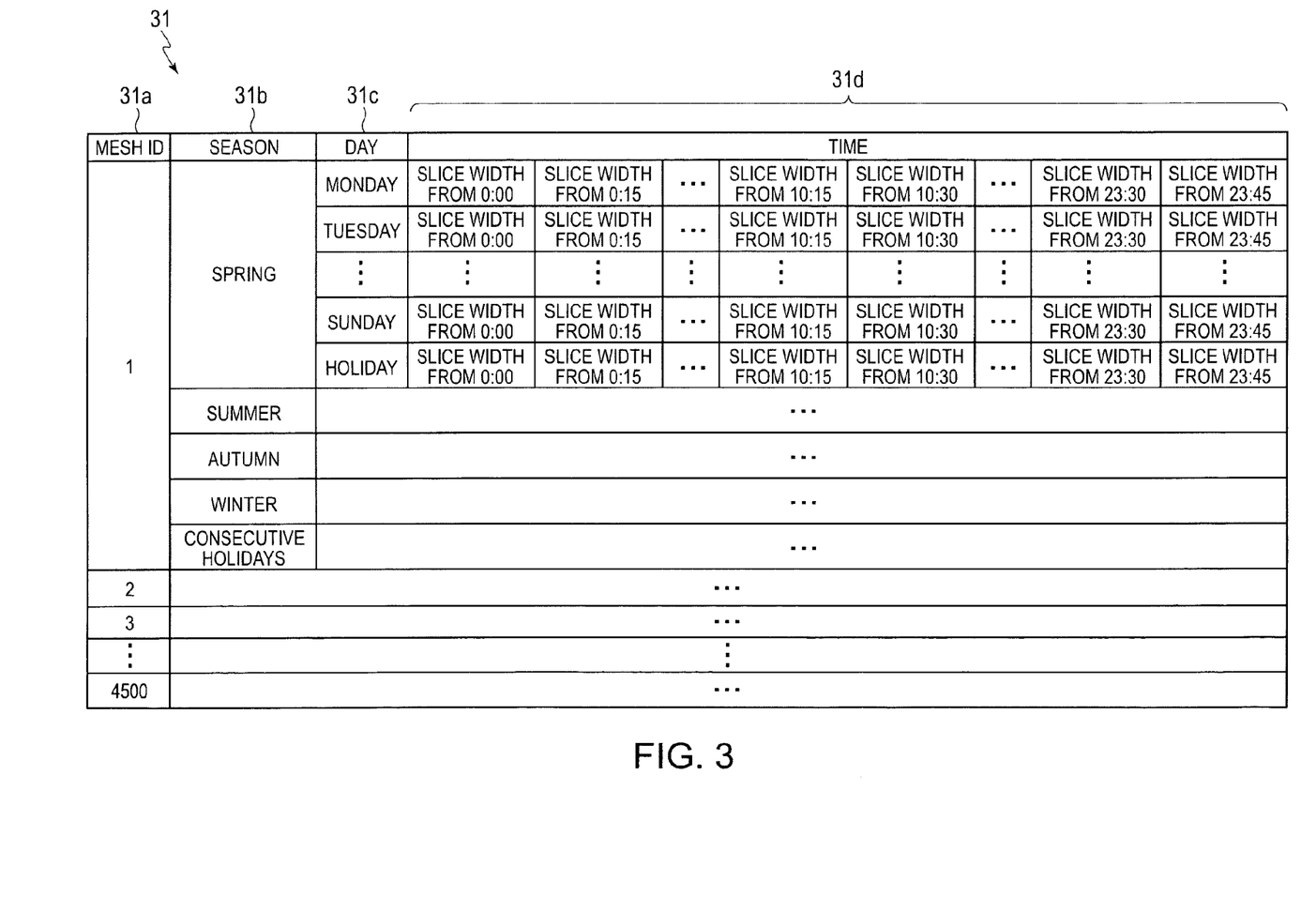
FIG. 3 is a diagram of an exemplary data structure for slice width data.

FIG. 3 shows a data structure for the slice width data 31. The slice width data 31 may be made up of a map mesh (hereinafter called a mesh) ID 31a, a season 31b, a day 31c, and slice widths 31d that serve as distance ranges. The mesh ID 31a may be an identifier that is assigned to each of the rectangular meshes, for example, measuring 10 kilometers by 10 kilometers, into which the entire country may be divided. The next level of data down from the mesh ID is the season 31b. The season 31b may be used to divide the slice width data 31 into data for the spring, summer, autumn, winter, and consecutive holidays. The next level of data is the day 31c, made up of the days of the week, plus a holiday.

The slice widths 31d may be stored for each mesh and represent the distance range that an automobile is predicted to be able to in as a prescribed time interval (e.g., 15 minutes, with 24 hours worth of data stored in 15-minute units). In other words, each slice width 31d may be prediction data into which the mesh ID 31a (region), the season 31b, the day 31c, and the time of day have been factored. For example, the slice widths 31d may be statistically processed data based on VICS® signals and probe information collected by a control center from individual automobiles. For example, based on VICS® signals and probe information corresponding to each link within the mesh, the average vehicle speed on all the links within the mesh may be computed, and the average vehicle speed may be multiplied by a prescribed time interval (15 minutes) to compute the distance that serves as the slice width 31d for the mesh.

Figure 4:
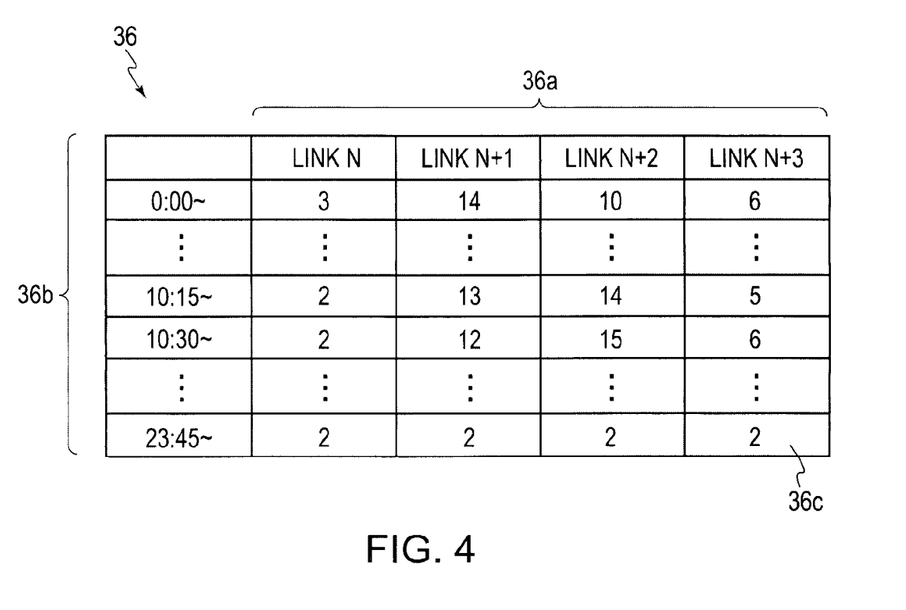
FIG. 4 is a diagram of an exemplary data structure for traffic data.

Next, the traffic data 36 will be explained according to FIG. 4. FIG. 4 shows a data structure for the traffic data 36. The traffic data 36 may be created for each mesh ID 31*a*, for example, and may include a link cost 36*c* for a link ID 36*a* of each link for each time period 36*b*. The time periods 36*b* are set as 15-minute units, partitioned in the same manner as the time periods that are set for the slice width data 31 (e.g., a period from 0:00 to 0:14). The link cost 36*c* may be data indicating the average time required to pass through the link during the time period 36*b*, such as 3 minutes, for example. In other words, the link cost 18*d* in the route data 18 is based on the length of the link, the road width, and the like, but does not take the time period 36*b* into account. The link cost 36*c* in the traffic data 36 is a cost that reflects the traffic conditions in the particular time period 36*b*. The link cost 36*c* is added to the link cost 18*d* in the route data 18 and otherwise manipulated to create a new link cost LC.

Next, an exemplary guidance method will be described with reference to FIG. 5. The exemplary method may be implemented, for example, by one or more components of the above-described system 1. However, even though the exemplary structure of the above-described system 1 may be referenced in the description, it should be appreciated that the structure is exemplary and the exemplary method need not be limited by any of the above-described exemplary structure.

Figure 5:
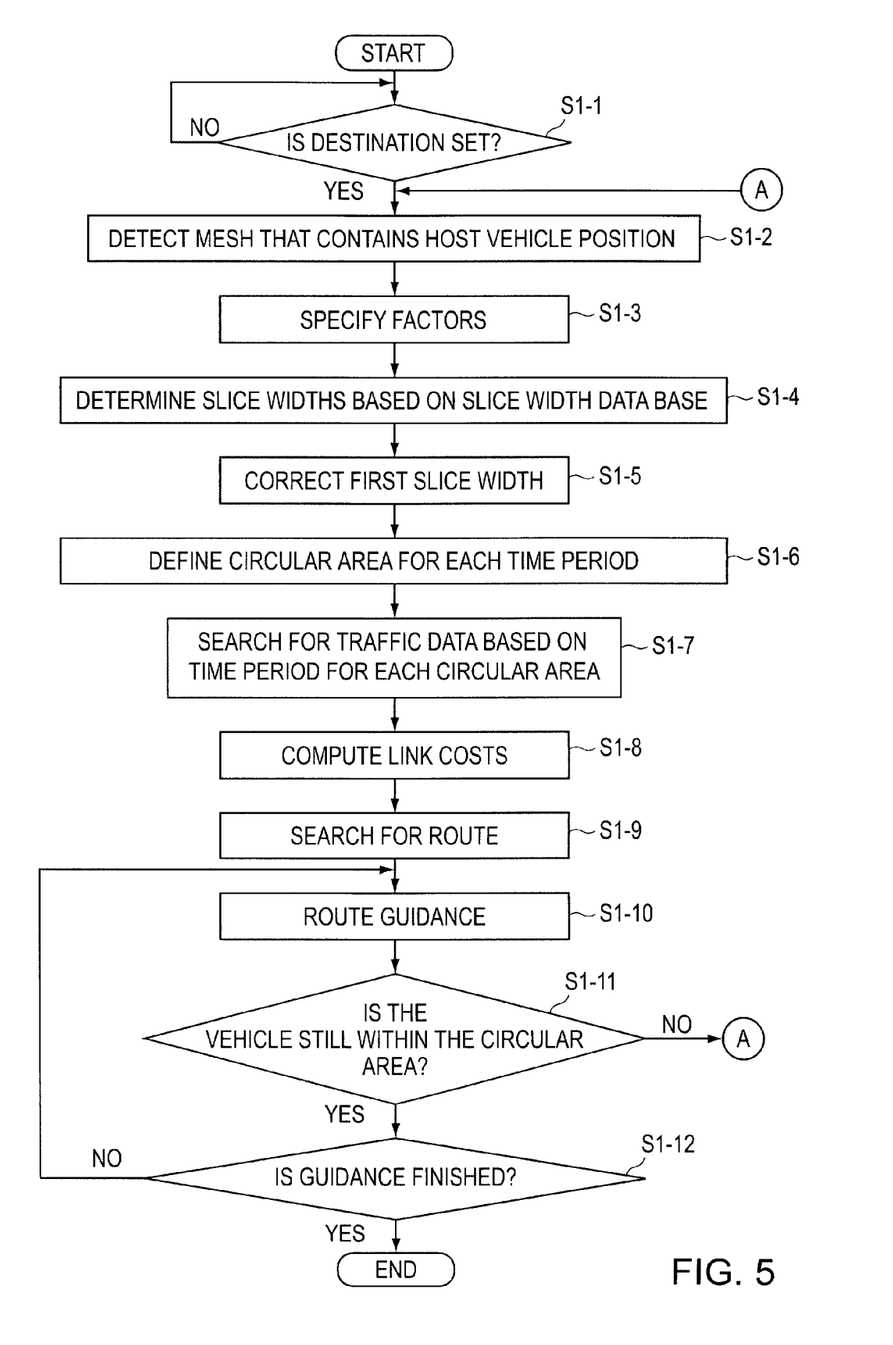
FIG. 5 a flowchart showing an exemplary guidance method.

As shown in FIG. 5, first, the CPU 10 waits for a destination to be set, such as by an operation of a touch panel, the operation switch 23, or the like, in accordance with the route guidance program that is stored in the ROM 12 (step S1-1). When the CPU 10 determines that the destination has been input (YES at step S1-1), the CPU 10 temporarily stores the coordinates and the like for the destination in the RAM 11.

Next, the CPU 10 computes the current position of the vehicle by using both radio navigation and autonomous navigation. Based on the map drawing data 19 and the like, the CPU 10 locates the mesh that contains the host vehicle position and obtains the mesh ID 31*a* (step S1-2). Next, the CPU 10 obtains the current date and the current time from, for example, a built-in clock in the navigation unit 2, and specifies the factors of the current season 31*b*, the day 31*c*, and the time period (step S1 -3). Once the factors of the mesh ID 31*a*, the current season 31*b*, the day 31*c*, and the time period are specified, the CPU 10 reads the slice width data 31 and, based on the slice width data 31, selects a temporal sequence of four slice widths 31d (step S1-4).

For example, if the season 31*b* is spring, the day 31*c* is Monday, and the time is within the time period 10:15 to 10:29, the CPU 10 will read the slice width data 31*d* for the time period 10:15 to 10:29 from among the slice width data 31 shown in FIG. 3. For example, if the slice width 31*d* is 6.0 kilometers, it indicates that in the current mesh, the distance range that a vehicle can travel in 15 minutes is approximately 6 kilometers.

Next, the CPU 10 reads the slice width 31*d* for the time period 10:30 to 10:44 as a second slice width 31*d* for the same mesh 31*a*, the season 31*b*, and the day 31*c*. The slice width 31*d* that is read at this time is data that indicates the distance range that the vehicle can travel during the time period 10:30 to 10:44, starting from the position to which the vehicle advances during the time period 10:15 to 10:29. The slice width 31*d* may be 5.6 kilometers, for example.

The CPU 10 also reads the slice widths 31*d* for the time periods 10:45 to 10:59 and 11:00 to 11:14 as third and fourth slice widths 31*d* for the same mesh ID 31*a*, the season 31*b*, and the day 31*c*, the slice widths 31*d* being 6.3 kilometers and 5.8 kilometers, respectively. In this manner, the CPU 10 obtains the slice widths 31*d* that predict the distances that the vehicle will advance within the four consecutive time periods of 10:15 to 10:29, 10:30 to 10:44, 10:45 to 10:59, and 11:00 to 11:14.

Next, as shown in FIG. 5, the CPU 10 corrects the first slice width 31*d* (step S1-5). As described above, the first slice width 31*d* predicts the distance that the vehicle will travel during the 15 minutes from 10:15 to 10:29. Therefore, if the current time is 10:20, for example, the CPU 10 re-computes the slice width 31*d* according to the time remaining until the end of the current time period, which ends at 10:29. (The time from 10:20 to 10:29 is 10 minutes.) In other words, if the predicted travel distance for 15 minutes is 6.0 kilometers, the distance for 10 minutes will be 4.0 kilometers, so the CPU 10 corrects the first slice width 31*d* to 4.0 kilometers and stores the corrected slice width 31*d* in the RAM 11.

Figure 6:
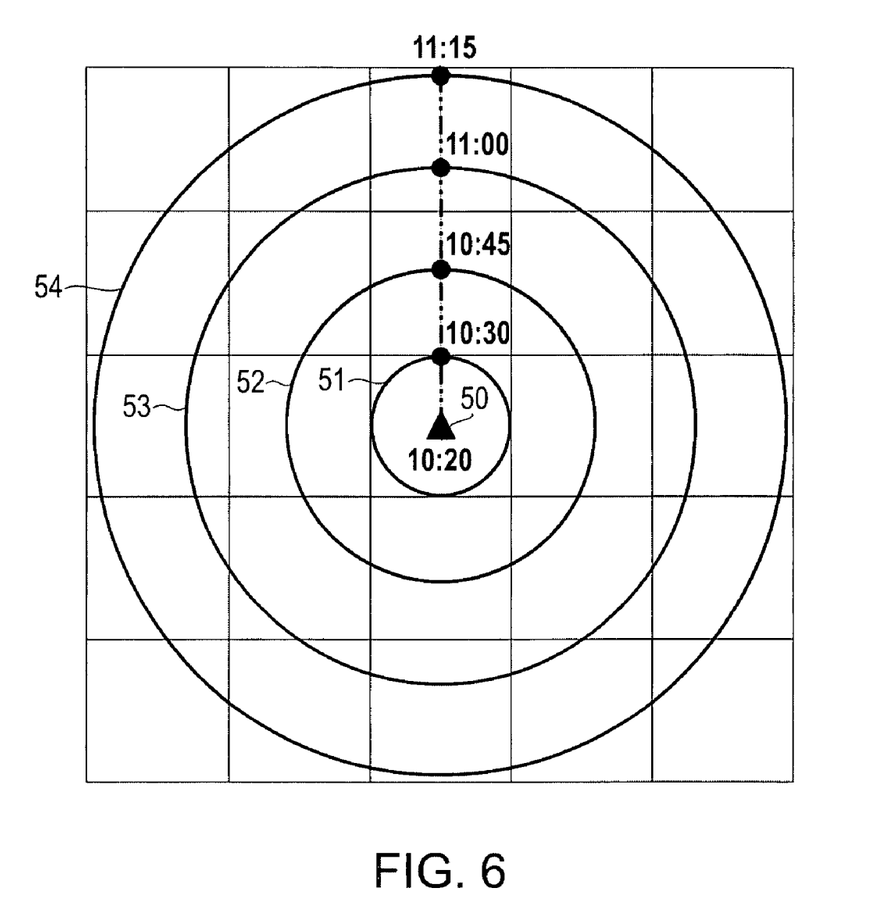
FIG. 6 is a diagram of exemplary first to fourth circular areas.

Next, the CPU 10, using the four slice widths 31*d*, defines a circular area for each predicted distance range (step S1-6). First, as shown in FIG. 6, the CPU 10 uses the first slice width 31*d* that is stored in the RAM 11 to define a first circular area 51, with its center at the current host vehicle position 50. The corrected first slice width 31*d* is 4.0 kilometers, so the first circular area 51 forms a circle with a radius of 4.0 kilometers around the host vehicle position 50. The predicted distance range that the vehicle will travel within the time period from 10:20 to 10:29 lies within the first circular area 51.

Next, the CPU 10 defines a second circular area 52, which surrounds the first circular area 51 and whose circumference is separated from the circumference of the first circular area 51 by the distance in the second slice width 31*d* (5.6 kilometers). The second circular area 52 is the predicted distance range that the vehicle will travel within the time period from 10:30 to 10:44.

The CPU 10 also uses the third and fourth slice widths 31*d* to define a third circular area 53 and a fourth circular area 54, respectively. The third circular area 53 surrounds the second circular area 52 and its circumference is separated from the circumference of the second circular area 52 by the distance in the third slice width 31*d* (6.3 kilometers). The fourth circular area 54 surrounds the third circular area 53 and its circumference is separated from the circumference of the third circular area 53 by the distance in the fourth slice width 31*d* (5.8 kilometers). The third circular area 53 is the predicted distance range that the vehicle will travel within the time period from 10:45 to 10:59. The fourth circular area 54 is the predicted distance range that the vehicle will travel within the time period from 11:00 to 11:14. Thus the first to fourth circular areas 51 to 54 are defined concentrically around the current host vehicle position 50.

Next, as shown in FIG. 5, the CPU 10 searches for traffic data 36 in the traffic database 35, based on the time periods that correspond to the first to fourth circular areas 51 to 54 (step S1-7). First, the CPU 10 searches for the traffic data 36 that corresponds to the mesh ID of the mesh that contains the current host vehicle position 50. When the CPU 10 locates the corresponding traffic data 36, it first reads the link costs 36*c* that correspond to the links within the first circular area 51. The first circular area 51 is the predicted distance range that the vehicle can travel in the time period from 10:20 to 10:29, so the CPU 10 finds the link costs 36*c* that correspond to the time period 36*b* from 10:20 to 10:29.

The CPU 10 also locates the traffic data 36 that corresponds to the links within the second circular area 52 and then reads the link costs 36*c* in the traffic data 36. As shown in FIG. 6, several different meshes are contained within the second circular area 52, so the CPU 10 searches for traffic data 36 for each mesh. From each set of traffic data 36, the CPU 10 reads the link costs 36*c* for the time period from 10:30 to 10:44, and from among those link costs 36c, the CPU 10 reads the link costs 36c for the links that are contained within the second circular area 52.

In the same manner, the CPU 10 reads the link costs 36c in the traffic data 36 for the time periods from 10:45 to 10:59 and from 11:00 to 11:14 for each mesh within the third and fourth circular areas 53 and 54, respectively.

Next, the CPU 10 uses the link costs 36c that it has read, and the link costs 18d in the route data 18 that correspond to the same links to which the link costs 36c correspond, to compute the new link costs LC (step S1-8). For example, the CPU 10 creates the link costs LC by adding or otherwise manipulating the link costs 18d and the link costs 36c, then stores the link costs LC temporarily in the RAM 11.

Figure 7:
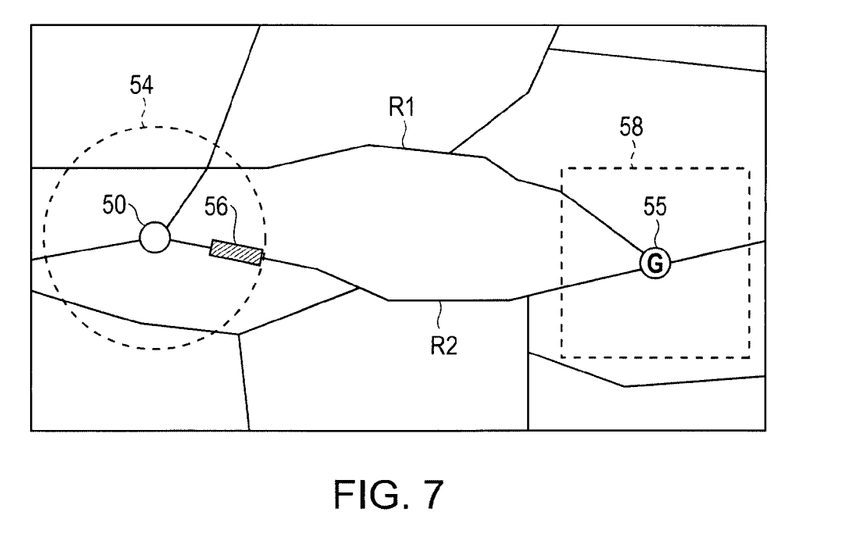
FIG. 7 is a diagram of an exemplary route search method.

Once the CPU 10 has created the link costs LC for the links that are contained within the circular areas 51 to 54, it uses the link costs LC to search for a route from the current host vehicle position to the destination coordinates that are stored in the RAM 11 (step S1-9). At this time, the CPU 10, as shown in FIG. 7, uses the route data 18 at a level that includes narrow roads, both within the first to fourth circular areas 51 to 54 and within a destination-surrounding region 58 (for example, a square measuring 30 kilometers by 30 kilometers). Between the first to fourth circular areas 51 to 54 and the destination-surrounding region 58, the CPU 10 uses the route data 18 at a higher level, a level that includes main roads such as national highways and the like. Also, because the link costs 36c were read only for the links within the first to fourth circular areas 51 to 54, the CPU 10 uses only the link costs 18d in the route data 18 in searching for a recommended route within the destination-surrounding region 58 and between the first to fourth circular areas 51 to 54 and the destination-surrounding region 58.

Within the first to fourth circular areas 51 to 54, because the traffic data 36 for approximately 60 minutes ahead is factored into the prediction process at the current point in time, congestion that is not yet occurring, but will occur hereafter, can be predicted. For example, as shown in FIG. 7, the CPU 10 can detect a congestion-predicted road 56, where congestion is predicted to occur naturally, due to a rush hour or the like, at the time when the vehicle passes through (for example, 11:00 to 11:14), even though congestion is not occurring there at the current time (10:20). The CPU 10 can thus search for a route that avoids the congestion-predicted road 56. For example, in a case where the CPU 10 locates a first route R1 and a second route R2 that connect a host vehicle position 50 and a destination 55, but the second route R2 contains the congestion-predicted road 56, the CPU 10 can determine that the link cost LC for the congestion-predicted road 56 is high and can therefore compute the first route R1 as the recommended route, because it avoids the congestion-predicted road 56.

Figure 8:
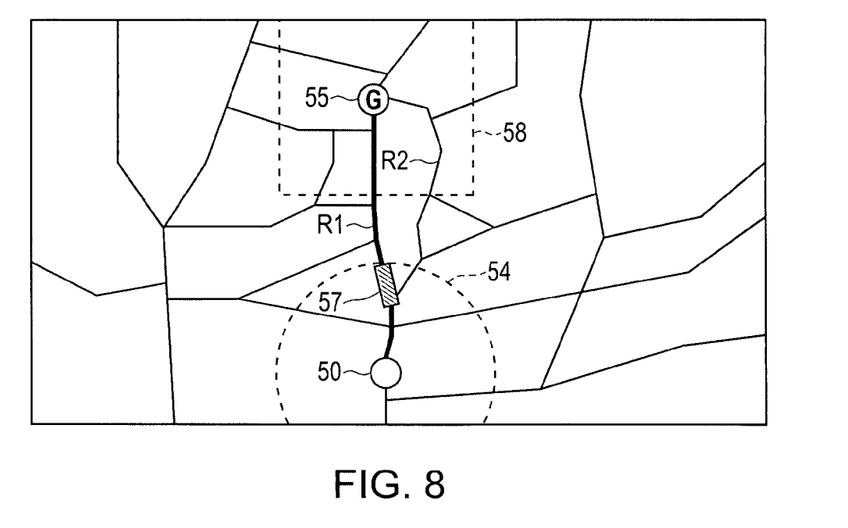
FIG. 8 is a diagram of an exemplary route search method.

Conversely, as shown in FIG. 8, even though congestion is occurring at the current time (10:20) on a currently congested road 57 on a first route R1 from a host vehicle position 50 to a destination 55, due to a rush hour or the like, the congestion might be predicted to end by the time when the vehicle passes through (for example, 11:00 to 11:14). In this case, the CPU 10 can determine that the link cost LC is low for the first route R1, which includes the currently congested road 57, and therefore select the first route R1, where congestion is currently occurring but is predicted to end by the time the vehicle passes through, instead of selecting a second route R2, where congestion is not occurring, but which would take more time than the first route R1.

Once the recommended route has been determined, the CPU 10 computes the time required to reach the destination and stores it temporarily in the RAM 11. Next, as shown in FIG. 5, the CPU 10 executes route guidance by displaying the recommended route on the display 25 (step S1-10). The CPU 10 outputs to the image processor 20 data such as links and the like that indicate the recommended route. Based on the data that were input, the image processor 20 reads the map drawing data 19 and creates output data that include the recommended route from the current host vehicle position 50 to the destination. The output data are stored temporarily in the image memory 21 and are output to the display 25 as image signals.

Figure 9A:
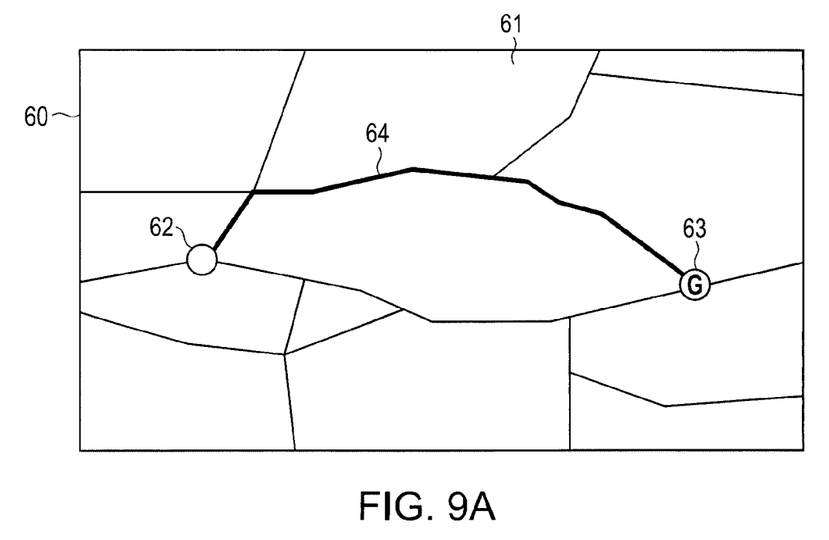
FIG. 9A is a diagram of an exemplary guidance screen.
Figure 9B:
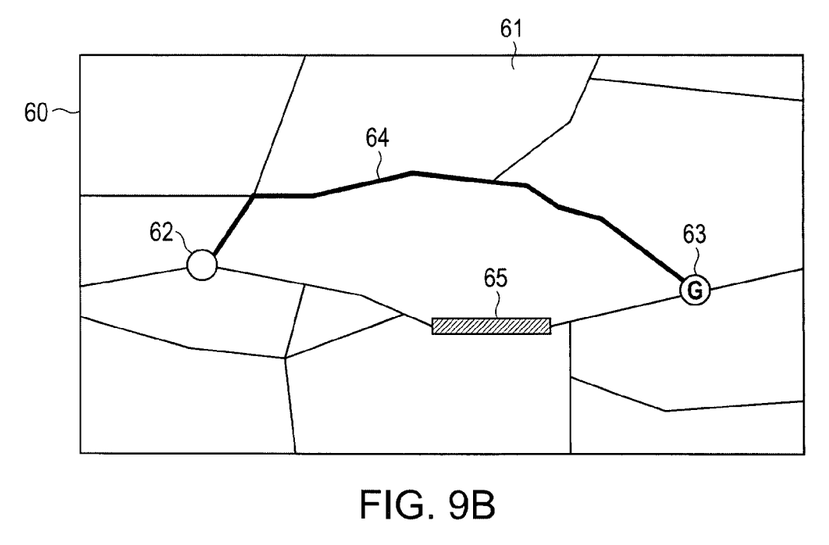
FIG. 9B is a diagram of an exemplary guidance screen that shows a road where congestion is predicted.

According to the above exemplary method, a guidance screen 60 may be displayed on the display 25, as shown in FIG. 9A. On the guidance screen 60, a host vehicle position marker 62, a destination marker 63, and a recommended route 64 that connects the markers 62 and 63 are superimposed on a map image 61, which is a map from the host vehicle position 50 to the destination. At this time, voice guidance for the route may also be output from the speaker by the voice processor 24. Also, depending on a variety of mode settings, a congestion prediction marker 65 may be displayed on the map image 61 to indicate a road where congestion is predicted at the time when the vehicle will pass through.

Returning to FIG. 5, while executing guidance for the recommended route, the CPU 10 determines whether the vehicle is still within the fourth circular area 54 (step S1-11). If the CPU 10 determines that the vehicle is still within the fourth circular area 54 (YES at step S1-11), the CPU 10 determines whether the guidance is finished (step S1-12). According to this example, the CPU 10 determines whether the vehicle has arrived at the destination, or whether a route guidance interruption operation has been executed by the operation switch 23 or a touch panel. If the CPU 10 determines that the guidance is not finished (NO at step S1-12), it returns to step S1-10 and continues the route guidance.

On the other hand, if the CPU 10 determines that the vehicle is no longer within the fourth circular area 54 (NO at step S1-11), it returns to step 1-2, where it locates the mesh that contains the current host vehicle position and continues the method as described above within the new mesh.

If the vehicle has arrived at the destination, or if a route guidance interruption operation has been executed by a touch panel or the operation switch 23, the CPU 10 determines that the guidance is finished (YES at step S1-12) and ends the guidance.

According to the above example, the navigation system 1 may store the slice width data 31, which predicts the distance range the vehicle can travel from the current host vehicle position in a predetermined interval (e.g., 15 minutes) during various time periods, in the slice width database 30. The navigation system 1 also includes the traffic database 35 that stores the link costs 36c, which are created for each link in each mesh based on the traffic circumstances in each time period. Based on the slice width data 31, the CPU 10 may define the first to fourth circular areas 51 to 54 concentrically around the current host vehicle position in a temporal sequence using the current time as a reference.

According to the above example, the CPU 10 may search for the recommended route from the current host vehicle position to the destination using the link costs 36c for the links in the first to fourth circular areas 51 to 54 and for the time periods that correspond to the first to fourth circular areas 51 to 54. Because the CPU 10 can use the slice width data 31 to predict the time periods in which the vehicle will traverse those links, it can use the traffic data 36 for the appropriate time periods (i.e., when the vehicle is predicted to actually travel the links). Therefore, even though the traffic volume and congestion level vary on almost all roads according to the time period, the roads where congestion will naturally occur can be predicted in advance by factoring those time-related variations into the predictions. A route can therefore be recommended to avoid congestion that will occur at the time the vehicle passes through. A recommended route can also be specified where congestion will have ended by the time the vehicle passes through, even if congestion is occurring at the current time.

According to the above example, the CPU 10 of the navigation system 1 may synchronize the time period for the first circular area 51 with the current time and may correct the slice width 31*d* accordingly by shortening it. Because the first circular area 51 can therefore be defined more accurately, the accuracy of the second to fourth circular areas 52 to 54 can be improved.

According to the above example, the slice width data 31 has a slice width 31*d* for each combination of the factors of the mesh ID 31*a*, the season 31*b*, the day 31*c*, and the time period. Regional factors, seasonal factors, and time period factors can therefore be incorporated into the slice widths 31 *d*, so the accuracy of the slice widths 31*d* can be improved.

Examples of creating the slice width data 31 and distributing the data will now be described with reference to FIGS. 10 to 14.

Figure 10:
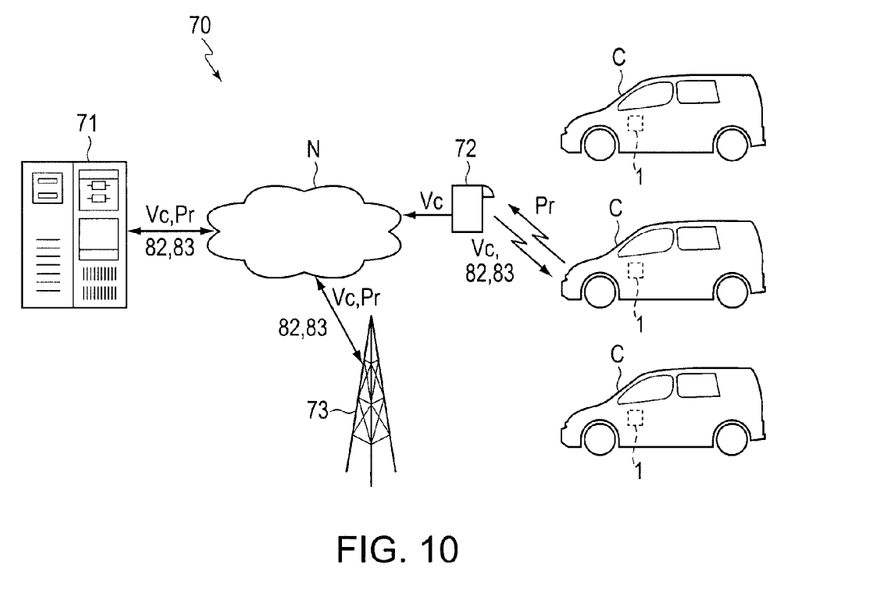
FIG. 10 is a diagram of an exemplary data statistics system.

As shown in FIG. 10, a data statistics system 70, which may serve as a route guidance system, may include a statistical server 71, which serves as a statistical processing server. The statistical server 71 may statistically process of VICS® signals and/or probe information. The statistical server 71 may be connected such that it can receive various types of data from a beacon 72 or a base station 73 and may also be connected such that it can both send and receive data to and from navigation systems 1 that are installed in automobiles C. The statistical server 71 may receive probe data Pr over a network N, as probe information and VICS® signals Vc as road traffic information from each navigation system 1, from the beacon 72, and from a traffic management server (not shown). The probe data Pr may include data on the position, speed, and operating characteristics of the automobile C, as well as the time.

Figure 11:
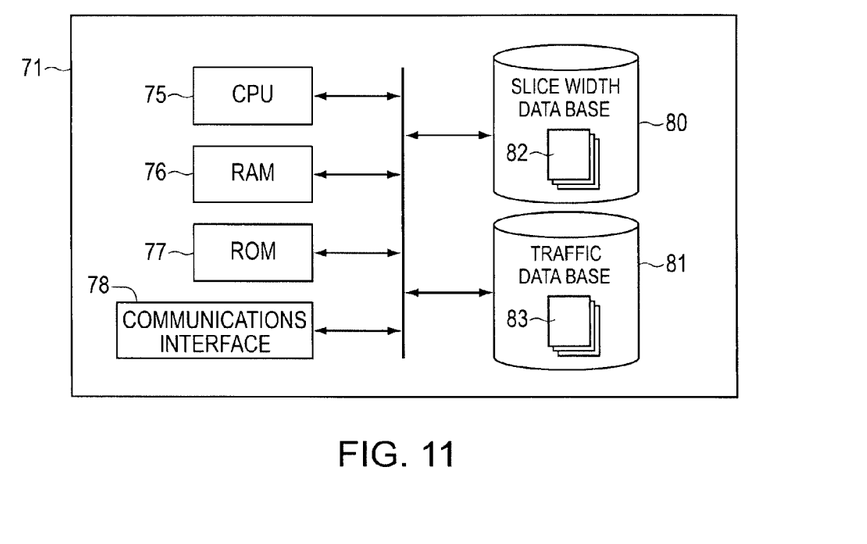
FIG. 11 is a block diagram of an exemplary statistical server.

As shown in FIG. 11, the statistical server 71 may include a controller (e.g., CPU 75) for, among other things, statistical processing. The statistical server 71 may include a RAM 76, a ROM 77, a communications interface 78, a slice width database 80, which serves as a storage portion for predicted distance range data, and a traffic database 81, which serves as a storage portion for traffic data. The CPU 75 may input the probe data Pr from the navigation systems 1 via the communications interface 78 and may statistically process the probe data Pr according to a statistical processing program that is stored in the ROM 77. The CPU 75 may also receive the VICS® data Vc from the traffic management server or from the beacon 72 and statistically processes the VICS® data Vc. Also, slice width data 82 for the entire country are stored in the slice width database 80 as predicted distance range data, and traffic data 83 are stored in the traffic database 81.

Figure 12:
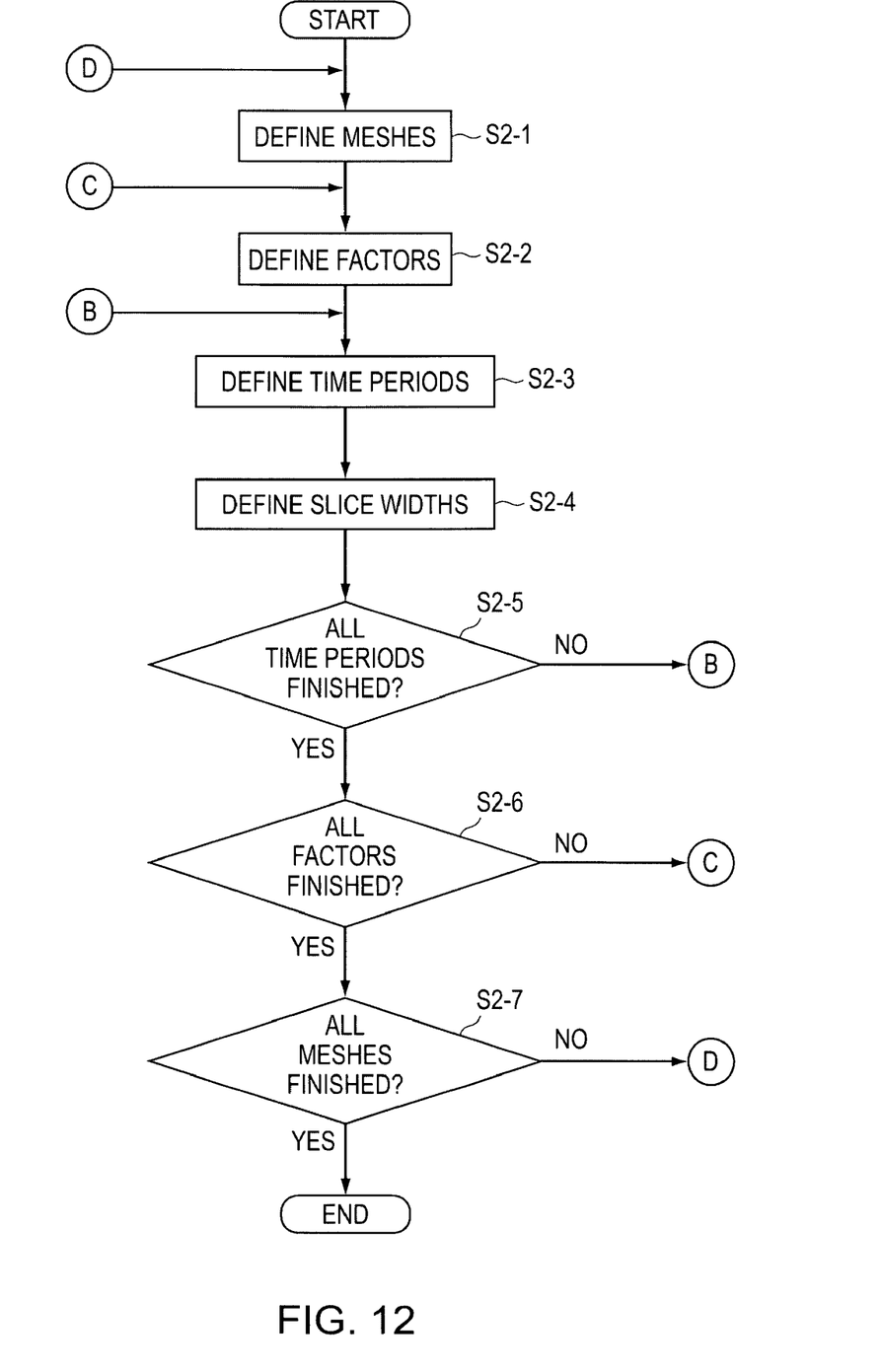
FIG. 12 is a flowchart showing an exemplary statistical processing method.

Next, an exemplary statistical processing method will be described with reference to FIG. 12. The exemplary method may be implemented, for example, by one or more components of the above-described server 71. However, even though the exemplary structure of the above-described server 71 may be referenced in the description, it should be appreciated that the structure is exemplary and the exemplary method need not be limited by any of the above-described exemplary structure.

First, the CPU 75 in the statistical server 71, (e.g., based on the statistical processing program that is stored in the ROM 77), defines meshes that determine the slice widths (step S2-1). The CPU 75 then defines the slice width factors (step S2-2). According to this example, the factors are the season and the day, so the CPU 75 determines the factors for computing slice widths, such as Mondays in spring or the like. Next, the CPU 75 defines the time periods that will determine the slice widths (step S2-3). The time periods are divided into predetermined intervals (e.g., 15-minute intervals) in the same manner as in the slice widths 31*d* described above.

Figure 13:
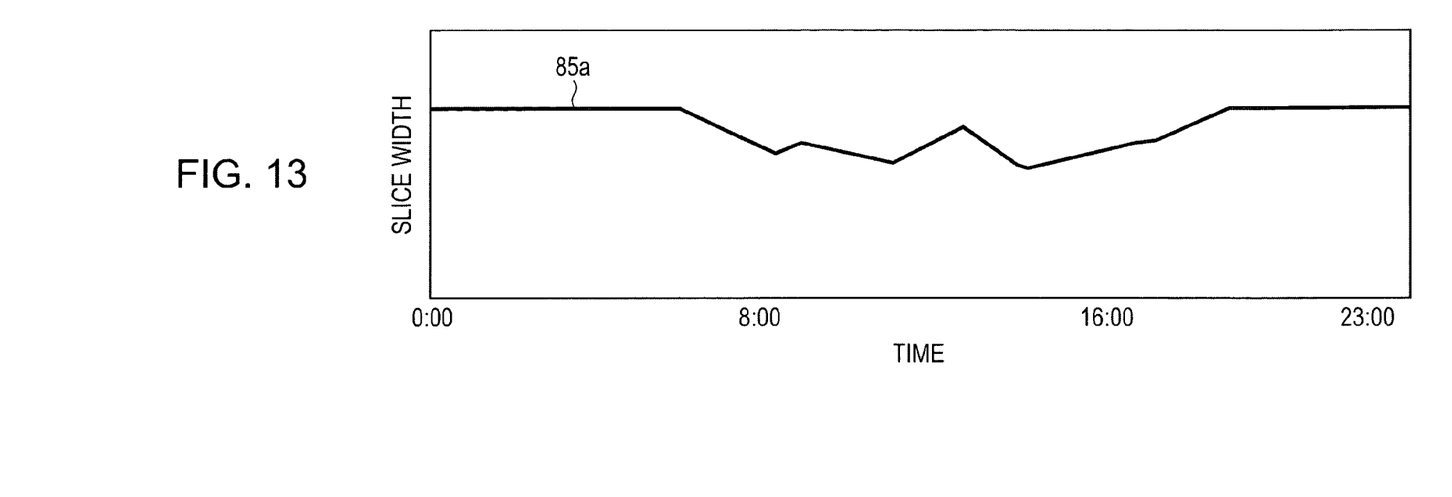
FIG. 13 is a diagram of exemplary statistical results for a slice width in a region A.
Figure 14:
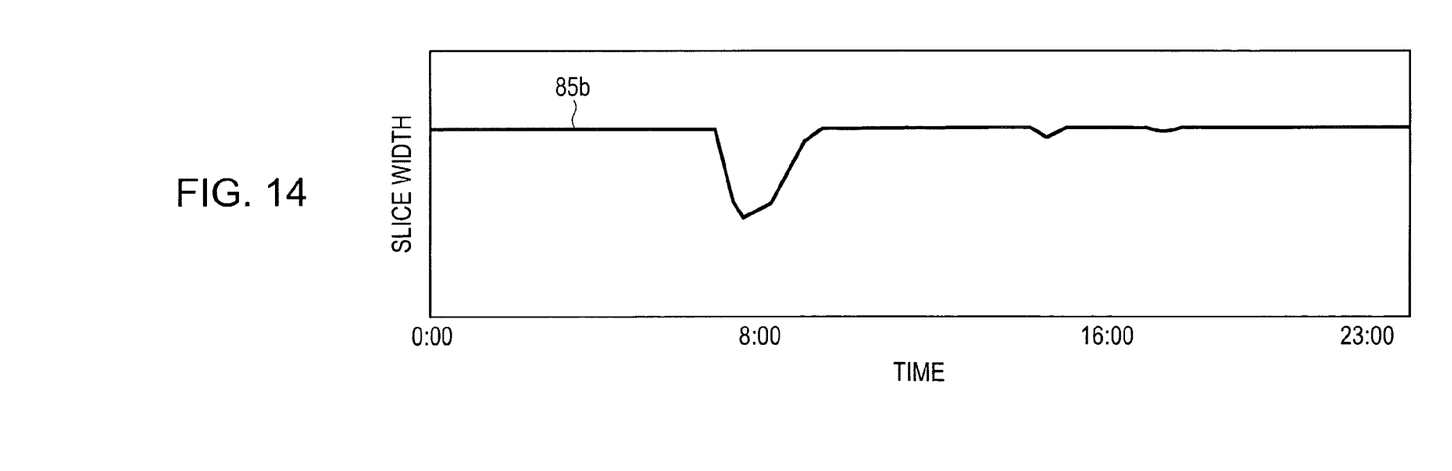
FIG. 14 is a diagram of exemplary statistical results for a slice width in a region B.

Once each of the factors is defined, the CPU 75 defines the slice widths (step S2-4). For example, based on the probe data Pr and the VICS® data Vc, the CPU 75 statistically processes distance ranges that vehicles drive during the time period from 10:15 to 10:29. Based on the resulting statistically processed slice widths, slice width graphs such as graphs 85*a* and 85*b* in FIGS. 13 and 14 are obtained. The graph 85*a* shown in FIG. 13 is a graph that shows slice widths for Mondays in spring. It shows that except for the noon hour, the slice widths become progressively lower from the morning to the afternoon, and at night the slice widths gradually increase.

The graph 85*b* shown in FIG. 14 is a graph for a different region (mesh) from that described by the graph 85*a* in FIG. 13. Except for the region, the factors for the graph 85*b* are same as those for the graph 85*a* in FIG. 13, but the slice width decreases only during the morning and evening rush hours, with little change other than at those times. It can thus be seen that the distance that the vehicle travels within a specified time period varies significantly according to the region (mesh), time period, and the like. Therefore, the statistical server 71 defines a slice width for each factor and includes those slice widths in the slice width data 82 it creates.

Once the slice widths are defined, the CPU 75 determines whether the slice widths have been determined for all of the time periods (step S2-5). If the slice widths have not been determined for all of the time periods (NO at step S2-5), the process returns to step S2-3 and does the statistical processing of the slice widths for the next time period. If the slice widths have been determined for all of the time periods in one day in one season in one mesh (YES at step S2-5), the process proceeds to step S2-6.

Next, the CPU 75 determines whether the slice widths have been determined for all of the seasons, days, and the like (step S2-6). If the slice widths have not been determined for all of the factors (NO at step S2-6), the process returns to step S2-2 and does the statistical processing of the slice widths for the next season or day. If all of the slice widths have been determined for one mesh (YES at step S2-6), the process proceeds to step S2-7.

At step S2-7, the CPU 75 determines whether the slice widths have been determined for all of the meshes. If the slice widths have not been determined for all of the meshes (NO at step S2-7), the process returns to step S2-1 and does the statistical processing of the slice widths for the next mesh. If the slice widths have been determined for all of the meshes (YES at step S2-7), the process ends.

The CPU 75 does statistical processing of the probe data Pr and the VICS® data Vc in the same manner, computing link costs for each time period and creating the traffic database 81. The link costs that are created at this time are created on the assumption that they will be recomputed together with the link costs 18*d* in the route data 18 in the navigation system 1. Once the slice width database 80 and the traffic database 81 are created, the statistical server 71 transmits the slice width data 82 and the traffic data 83 to each navigation system 1 over network N. Through the communications interface 16, which serves as a receiving portion, the navigation system 1 receives the transmitted slice width data 82 and traffic data 83 and stores them in the slice width database 30 and the traffic database 35 in the navigation system 1. Thus the slice width data 31 and the traffic data 36 in the navigation system 1 can be successively updated.

According to the above example, the statistical server 71 may compute slice widths for each factor, based on the probe data Pr and the like collected from the automobiles C, and creates the traffic data 83. The statistical server 71 may also transmit the slice width data 82 and the traffic data 83 to the navigation system 1. The navigation system 1 can therefore successively update the slice width data 31 and the traffic data 36, so route searching can be carried out using the new slice width data 82 and traffic data 83.

In the examples described above, the first to fourth circular areas 51 to 54 were defined, but only one circular area or a plurality of circular areas other than four may also be defined.

In the examples described above, when route searching is carried out, the system uses the slice width data 31 to search for the recommended route within the first to fourth circular areas 51 to 54, which are centered on the host vehicle position (departure point), and uses the route data 18 to search for the recommended route outside the first to fourth circular areas 51 to 54. However, the slice width data 31 may be used to search for the entire route to the destination. Also, the predicted travel time to the destination and the actual travel time may be compared en route, and if a large discrepancy is found, searching for the recommended route, as described above, may be carried out again using the slice width data 31 and the traffic data 36, depending on the circumstances.

In the examples described above, the destination-surrounding region 58 is a square measuring 30 kilometers by 30 kilometers, but the destination-surrounding region 58 may be a circle, an ellipse, an irregular circle, or a polygon of any distance.

In the examples described above, if the slice width $31d$ obtained from the slice width data 31 is an indeterminate value such as null or the like, route searching may be executed using only the route data 18, without using the slice width data 31.

In the examples described above, the slice width data 31 may be used even if the vehicle is traveling on an expressway. The system may also search for a route for the vehicle to follow after it leaves the expressway, based the VICS® signals and the slice width data 31.

In the examples described above, the slice widths are created by the statistical server 71 through statistical processing of the probe data Pr and the like. Alternatively, the RAM 11 may store a driving history for the roads on which the vehicle equipped with the navigation system 1 has traveled, including the required travel times, time of day, speed, and the like. The CPU 10 may also serve as a driving learning portion, a first statistical processing portion, and a second statistical processing portion of the navigation system 1 and create or update the slice width data 31 and the traffic data 36 based on the driving history stored in RAM 11.

In the examples described above, the navigation system 1 transmits the probe data Pr to the statistical server 71, but the statistical server 71 may also do statistical processing of the probe data Pr that is transmitted from an on-board system other than the navigation system 1.

In the examples described above, the server that does the statistical processing of the probe data Pr and the like and the server that transmits the slice width data 82 and the traffic data 83 may be separate servers.

In the examples described above, the first to fourth circular areas 51 to 54 are defined as circular, but they need not be perfect circles and may be ellipses or irregular circles with protruding portions. For example, if the number of lanes or the like on one road is much greater than on other roads in its vicinity, an irregularly circular area may be defined with a protruding portion that corresponds to that road, or an elliptical area may be defined in which the road in question corresponds to the long axis of the ellipse.

In the examples described above, the first to fourth circular areas 51 to 54 are defined as circular using the slice widths $31d$ for the mesh that contains the host vehicle position, but an area may also be defined as a predicted distance ranges using the slice widths $31d$ for a mesh that is positioned on the perimeter of a defined area. Specifically, first the area closest to the host vehicle position (a first area) is defined using the slice widths $31d$ for the mesh that contains the host vehicle position. Next, if the perimeter of the first area is positioned in a different mesh from the mesh that contains the host vehicle position, the slice widths $31d$ for the mesh on the perimeter of the first area may be used to define the next area (a second area).

What is claimed is:

1. A navigation system to be installed in a vehicle, the system comprising:
   a memory that stores:
      slice widths which represent predicted distances that the vehicle can travel in a predetermined time for individual zones and individual time periods; and
      traffic data that is created based on traffic circumstances in individual links and individual time periods; and
   a controller that:
      selects a plurality of the slice widths in temporal sequence for a current position of the vehicle and a current time;
      defines, based on the selected plurality of the slice widths, a plurality of predicted distance ranges in temporal sequence that are centered at the current position of the vehicle, each of the plurality of predicted distance ranges representing an area;
      searches for a recommended route from the current position of the vehicle to a destination by using the traffic data for the links that are contained with the respective predicted distance ranges for the time periods that correspond to the predicted distance ranges.

2. The navigation system according to claim 1, wherein:
   the memory stores map data, the map data being divided into a plurality of map meshes, each mesh being a section of the map data;
   the memory stores the slice widths for each map mesh; and
   the controller detects the map mesh that contains the current position of the vehicle and selects the plurality of the slice widths that correspond to the detected map mesh.

3. The navigation system according to claim 1, wherein:
   the controller defines the predicted distance ranges as concentric circular areas centered at the current position of the vehicle.

4. The navigation system according to claim 1, wherein the controller:
   synchronizes the time period for the slice width closest to the current position of the vehicle with the current time; and
   corrects the slice width closest to the current position of the vehicle based on the synchronization.

5. The navigation system according to claim 1, wherein:
   the slice widths are created for individual zones, seasons, days, holidays, and consecutive holidays.

6. The navigation system according to claim 1, further comprising:

a receiver that receives, from outside the system, the slice widths or the traffic data.

7. The navigation system according to claim 1, wherein:
the memory stores a driving history for a road on which the vehicle has traveled, including a required travel time, a time period, and a speed; and
the controller creates or updates the slice widths or the traffic data based on the driving history.

8. The navigation system according to claim 1, wherein the controller provides route guidance along the recommended route.

9. The navigation system according to claim 1, wherein the controller:
defines the plurality of predicted distance ranges in temporal sequence by:
defining a first predicted distance range that the vehicle having started from the current position of the vehicle can travel in the predetermined time, based on the slice width for a time period that corresponds to the current time; and
defining a next predicted distance range that the vehicle can travel having started from the outer boundary of the first predicted distance range can travel in the predetermined time, based on the slice width for a time period following the time period that corresponds to the current time; and
searches for the recommended route by:
using the traffic data for the links that are contained within the first predicted distance range for the time period that corresponds to the current time; and
using the traffic data for the links that are contained within the next predicted distance range for the time period following the time period that corresponds to the current time.

10. A route search method for searching for a route from a current position of a vehicle to a destination, the method comprising:
accessing stored slice widths which represent predicted distances that the vehicle can travel in a predetermined time for individual zones and individual time periods;
accessing stored traffic data that was created based on traffic circumstances in individual links and individual time periods;
selecting a plurality of the slice widths in temporal sequence for the current position of the vehicle and a current time;
defining, based on the selected plurality of the slice widths, a plurality of predicted distance ranges in temporal sequence that are centered at the current position of the vehicle, each of the plurality of predicted distance ranges representing an area; and
searching for a recommended route from the current position of the vehicle to the destination by using the traffic data for the links that are contained with the respective predicted distance ranges for the time periods that correspond to the predicted distance ranges.

11. The route search method according to claim 10, further comprising:
storing map data, the map data being divided into a plurality of map meshes, each mesh being a section of the map data;
storing the slice widths for each map mesh; and
detecting the map mesh that contains the current position of the vehicle and selecting the plurality of the slice widths that correspond to the detected map mesh.

12. The route search method according to claim 10, further comprising:
defining the predicted distance ranges as concentric circular areas centered at the current position of the vehicle.

13. The route search method according to claim 10, further comprising:
synchronizing the time period for the slice width closest to the current position of the vehicle with the current time; and
correcting the slice width closest to the current position of the vehicle based on the synchronization.

14. The route search method according to claim 10, wherein:
the slice widths are created for individual zones, seasons, days, holidays, and consecutive holidays.

15. The route search method according to claim 10, further comprising:
receiving, from outside the system, the slice widths or the traffic data.

16. The route search method according to claim 10, further comprising:
storing a driving history for a road on which the vehicle has traveled, including a required travel time, a time period, and a speed; and
creating or updating the slice widths or the traffic data based on the driving history.

17. The route search method according to claim 10, further comprising providing route guidance along the recommended route.

18. The navigation method according to claim 10, further comprising:
defining the plurality of predicted distance ranges in temporal sequence by:
defining a first predicted distance range that the vehicle having started from the current position of the vehicle can travel in the predetermined time, based on the slice width for a time period that corresponds to the current time; and
defining a next predicted distance range that the vehicle can travel having started from the outer boundary of the first predicted distance range can travel in the predetermined time, based on the slice width for a time period following the time period that corresponds to the current time; and
searching for the recommended route by:
using the traffic data for the links that are contained within the first predicted distance range for the time period that corresponds to the current time; and
using the traffic data for the links that are contained within the next predicted distance range for the time period following the time period that corresponds to the current time.

19. A non-transitory computer-readable storage medium storing a computer-executable route search program, the program comprising:
instructions for accessing stored slice widths which represent predicted distances that the vehicle can travel in a predetermined time for individual zones and individual time periods;
instructions for accessing stored traffic data that was created based on traffic circumstances in individual links and individual time periods;
instructions for selecting a plurality of the slice widths in temporal sequence for a current position of the vehicle and a current time;
instructions for defining, based on the selected plurality of the slice widths, a plurality of predicted distance ranges in temporal sequence that are centered at the current position of the vehicle, each of the plurality of predicted distance ranges representing an area; and instructions for searching for a recommended route from the current position of the vehicle to a destination by using the traffic data for the links that are contained with the respective predicted distance ranges for the time periods that correspond to the predicted distance ranges.

20. A route guidance system that executes guidance for a route from a current position of a vehicle to a destination, the system comprising:

a controller that:

statistically processes road traffic information or probe information that is collected from individual vehicles;

creates slice widths which represent predicted distances that the vehicle can travel in a predetermined time for individual zones and individual time periods;

creates, based on the road traffic information or the probe information, traffic data based on traffic circumstances in individual links and individual time periods;

selects a plurality of the slice widths in temporal sequence for a current position of the vehicle and a current time;

defines, based on the selected plurality of the slice widths, a plurality of predicted distance ranges in temporal sequence that are centered at the current position of the vehicle, each of the plurality of predicted distance ranges representing an area;

searches for a recommended route from the current position of the vehicle to a destination by using the traffic data for the links that are contained with the respective predicted distance ranges for the time periods that correspond to the predicted distance ranges.

21. A navigation system to be installed in a vehicle, the system comprising:

means for accessing stored slice widths which represent predicted distances that the vehicle can travel in a predetermined time for individual zones and individual time periods;

means for accessing stored traffic data that was created based on traffic circumstances in individual links and individual time periods;

means for selecting a plurality of the slice widths in temporal sequence for a current position of the vehicle and a current time;

means for defining, based on the selected plurality of the slice widths, a plurality of predicted distance ranges in temporal sequence that are centered at the current position of the vehicle, each of the plurality of predicted distance ranges representing an area; and means for searching for a recommended route from the current position of the vehicle to a destination by using the traffic data for the links that are contained with the respective predicted distance ranges for the time periods that correspond to the predicted distance ranges.

* * * * *